(12) United States Patent
Sheefel

(10) Patent No.: US 8,944,524 B1
(45) Date of Patent: Feb. 3, 2015

(54) WHEEL WITH LOCKING CENTER BORE

(75) Inventor: Adam Sheefel, Warsaw, IN (US)

(73) Assignee: Custom Engineered Wheels, Inc., Warsaw, IN (US)

( * ) Notice: Subject to any disclaimer, the term of this patent is extended or adjusted under 35 U.S.C. 154(b) by 437 days.

(21) Appl. No.: 13/470,714

(22) Filed: May 14, 2012

(51) Int. Cl.
*B60B 27/06* (2006.01)

(52) U.S. Cl.
USPC .................. 301/121; 301/111.07; 301/111.01

(58) Field of Classification Search
CPC .............................. B60B 27/06; B60B 27/065
USPC .......... 301/111.01, 112, 121, 111.03, 111.04, 301/111.07
See application file for complete search history.

(56) References Cited

U.S. PATENT DOCUMENTS

| | | | | |
|---|---|---|---|---|
| 5,215,356 A | * | 6/1993 | Lin | 301/111.07 |
| 5,277,480 A | * | 1/1994 | Chiu | 301/111.07 |
| 5,716,107 A | * | 2/1998 | Parker et al. | 301/111.07 |
| 6,280,001 B1 | * | 8/2001 | Parker et al. | 301/112 |
| 6,354,670 B1 | * | 3/2002 | Cheng | 301/111.04 |
| 7,445,297 B2 | * | 11/2008 | Mercier et al. | 301/111.04 |
| 8,333,440 B2 | * | 12/2012 | Chen | 301/111.04 |
| 2013/0313890 A1 | * | 11/2013 | Nolet et al. | 301/121 |

* cited by examiner

*Primary Examiner* — Jason Bellinger
(74) *Attorney, Agent, or Firm* — Botkin & Hall, LLP

(57) ABSTRACT

A locking wheel useful for wheels on small vehicles. The locking wheel fits over a shaft and has a bore for receiving the end of the shaft. An outer member is connected to and spaced from the hub. A finger is adjacent to the bore and has a protrusion that extends into the bore. The finger is resilient and movable between a first and second position. The first position has the protrusion protruding into the bore and the second position has the protrusion outside of the bore with the finger being bent radially outward. The shaft has a notch or hole that receives the finger's protrusion. A locking device may selectively be placed between the outer member and the hub to prevent the finger from moving into its second position, thereby locking the hub onto the shaft.

13 Claims, 7 Drawing Sheets

WHEEL WITH LOCKING CENTER BORE

BACKGROUND OF THE INVENTION

Presently, wheels for small vehicles such as garbage cans or carts are difficult to remove and maintain. Typically, wheels are installed in such a way as to be nearly permanent without the use of special tools. Some wheels use a one way cantilevered catch having a protrusion that is chamfered in the direction of installation and sharp on the direction to pull the wheel off. The chamfer catches in a notch near the end of the axle. To remove such a wheel one would need a screwdriver or other object to pull the catch outward to remove the wheel. The use of cotter pins may also secure a wheel, but again requires a tool to remove the wheel.

Ideally, wheels for small vehicles should be easily installed and removed without tools. This is particularly important for garbage cans. Typically, aside from wheels, garbage cans are shaped so they can be nested within each other. If wheels can be easily removed, the cans could be stacked in a small space, with the wheels being stored in the innermost can. Upon delivery to its final location, the wheels could be installed on the can. Easily changeable wheels would also make maintenance simple. Modern plastic garbage cans are usually tough enough to take many years of abuse. However, protruding wheels are vulnerable to damage or wear as the moving part of the can that supports the weight of the can and its contents. Should a wheel become damaged throughout the life of a garbage can, the entire can would not have to be replaced. Replacement wheels, with simple instructions, could be shipped and installed on the garbage can, possibly even by an end user of the garbage can.

SUMMARY OF THE INVENTION

The present invention is a locking wheel. The wheel has an integrally molded hub that fits over the end of a shaft. The hub has a bore with an inner diameter for receiving a shaft and an outer surface. An outer member may be connected to and spaced from said hub. A finger is adjacent to the bore and has an inner surface and an outer surface. The finger includes a protrusion that has a raised surface relative to the inner surface of the finger. The finger is adapted for extending into the bore for a predetermined distance. The finger is resilient and movable between a first position and second position. The first position has the protrusion protruding inwardly into the bore. The second position has the protrusion located outwardly of the bore. In the second position the outer surface is located radially outward relative to the first position.

A locking device may be selectively used to restrain the movement of the finger from the first position into the second position.

In one aspect of the invention, the locking device may be insertable between the finger and an outer member that may be a cylinder spaced from the hub. In this case, the finger is blocked by moving from its first position to its second position due to the presence of the locking device between the finger and cylinder.

DETAILED DESCRIPTION OF INVENTION

Figure 1:
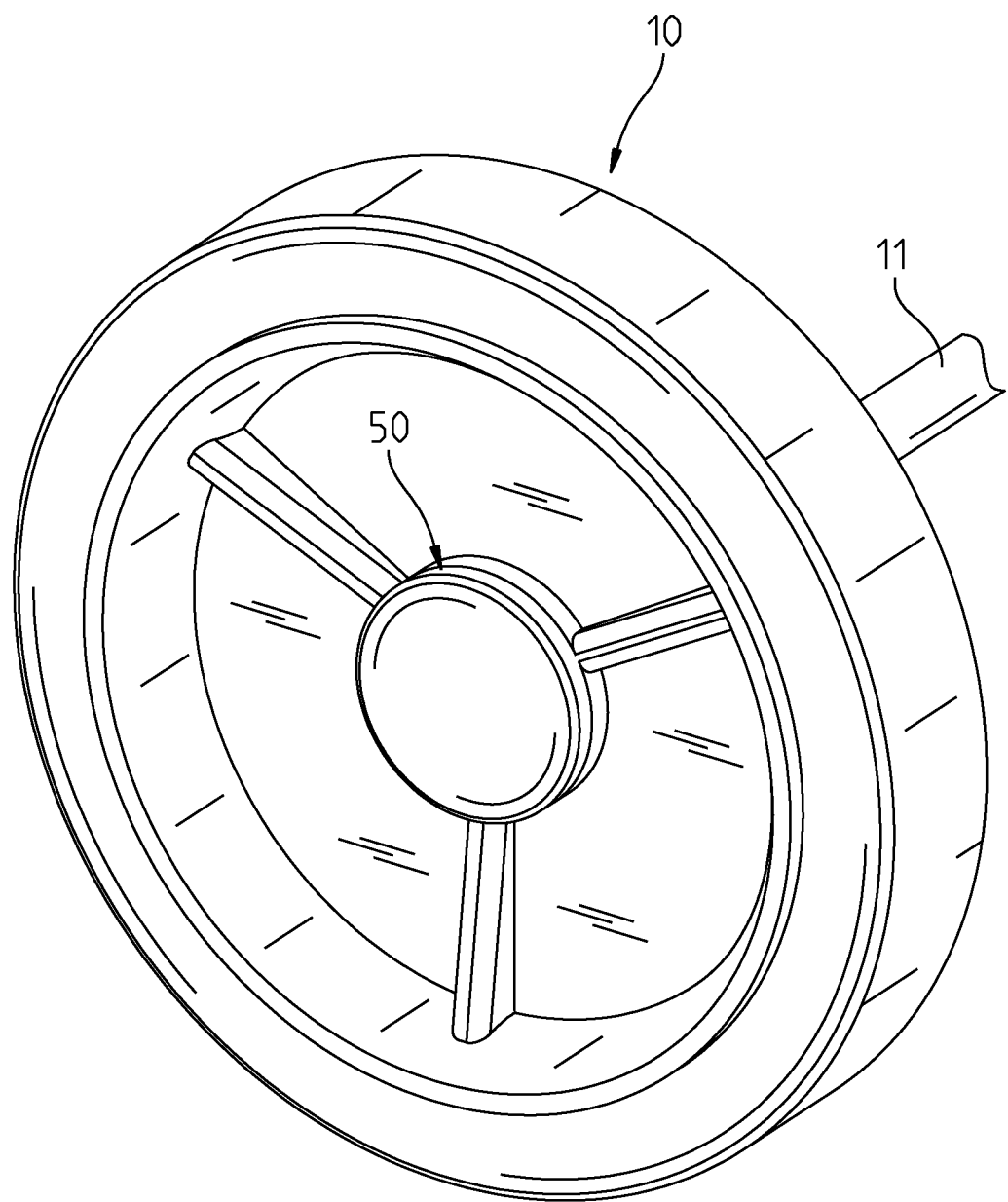
FIG. 1 is a perspective of the wheel installed on an axle.
Figure 3:
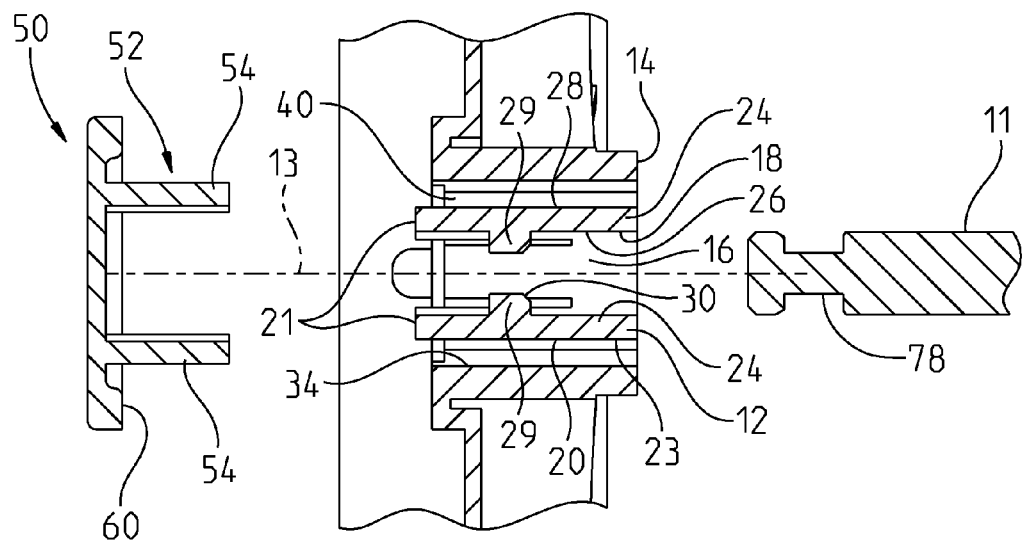
FIG. 3 is a sectional view taken about the line 3-3 in FIG. 2.
Figure 4:
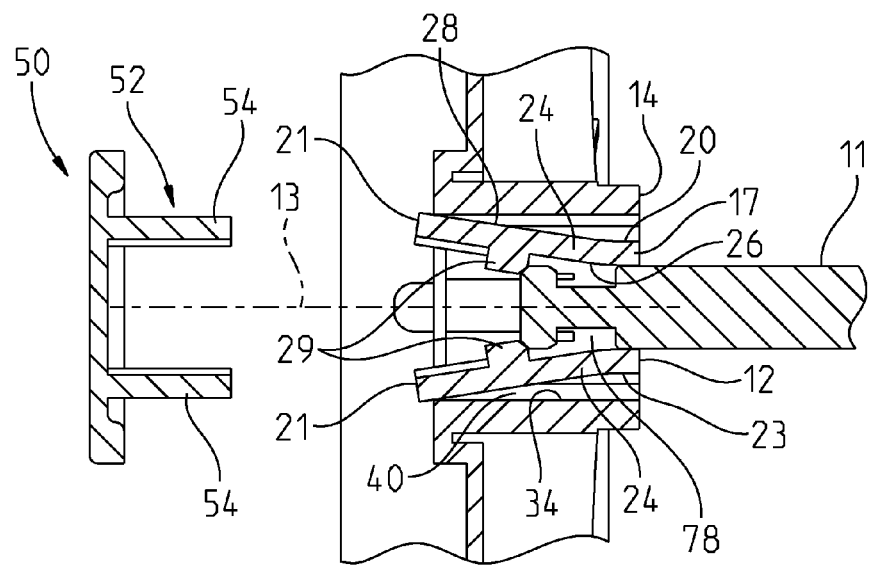
FIG. 4 is a sectional view taken about the line 3-3 in FIG. 2 showing the fingers bent into their second positions.
Figure 5:
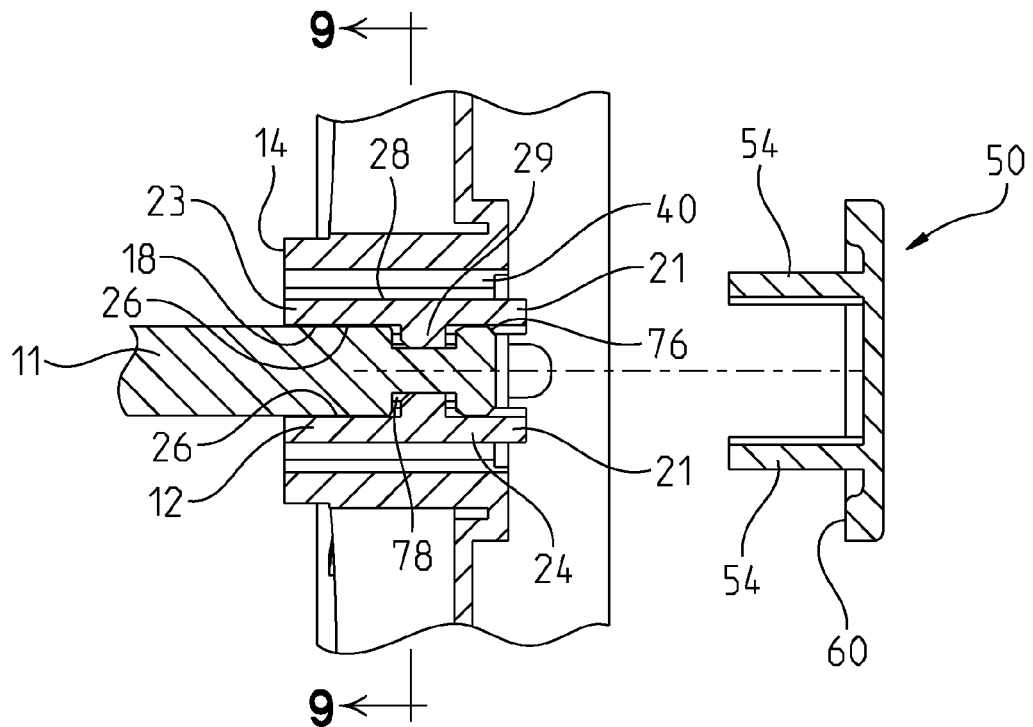
FIG. 5 is a sectional view taken about the line 3-3 in FIG. 2 showing the fingers in their first position with the cap near its installed position.
Figure 9:
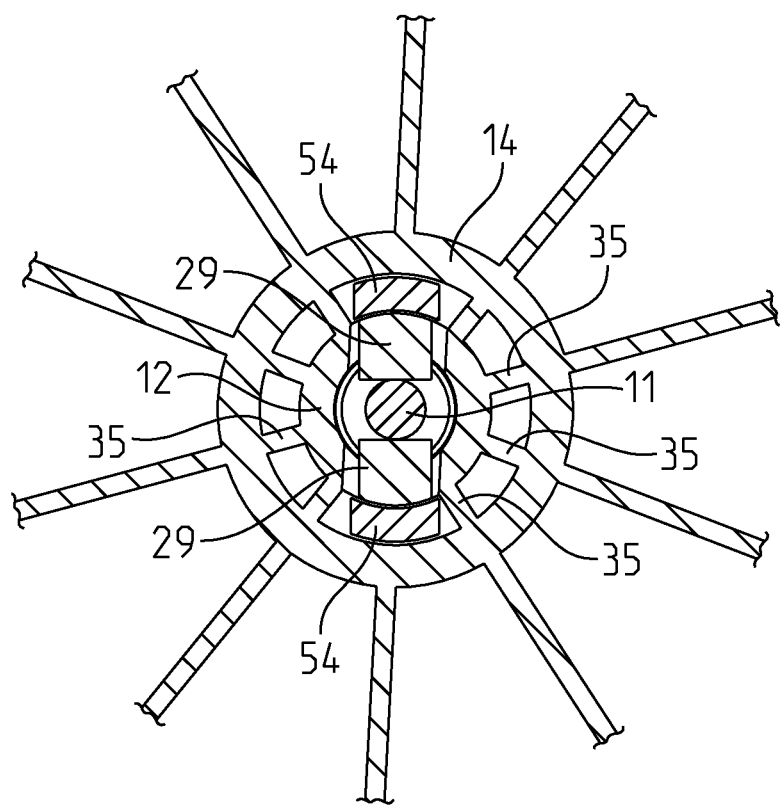
FIG. 9 is a sectional view taken about the line 9-9 in FIG. 5, with the locking cap installed.

The locking wheel 10 is shown in a perspective view in FIG. 1. The locking wheel 10 is particularly useful for securing a wheel to an axle shaft 11. The locking wheel 10 has a hub 12 located within an outer cylinder 14. The hub 12, shown in sectional FIGS. 3-6, has a bore 16, with an axis 13 and an inner diameter 18. The bore 16 extends completely through the hub 12 that has a bore wall 17 and the bore 16 has a rectangular aperture 19 at its outer end. The hub 12 has an outer surface 20 that is coaxial with the inner diameter 18 of said bore 16. A pair of opposing fingers 24 are cantilievered adjacent to the bore 16 in a direction aligned with and spaced from the axis 13 of the bore 16. Each finger 24 has a connected end 23 and a free end 21. The free ends 21 extend outwardly through the rectangular aperture 19. The fingers 24 each have a curved inner surface 26 that faces the bore 16 and an outer surface 28. The inner and outer surfaces 26, 28 are curved with the same radius as the inner diameter 18 and outer surface, 20 of the hub 12 respectively. This is shown in FIG. 9. As can be seen in FIGS. 5 and 9 the fingers 24 are part of the hub 12 itself and are segments of the bore wall 17. The connected ends 23 of the fingers 24 are farther from the rectangular aperture 19 and are integrally molded into the hub 12 to form a continuous connection at the connected end 23 of the fingers 24. A protrusion 29 extends from the inner surfaces 26 of the fingers 24 between connected ends 23 and their free ends 21, more near the free ends 21. Even though the fingers 24 are part of the hub 12 itself, it is contemplated that the fingers 24 could be external to the hub, with the protrusions 29 extending into the bore 16. FIG. 3 shows the finger 24 in a first position. In this first position, the protrusions 29 extend inwardly into the bore 16, and the inner surfaces 26 of the fingers 24 are at the same level and curvature as the rest of the inner diameter 18 of the bore 16. In the first position, the outer surface 28 of the fingers 24 are at the same level as the outer surface 20 of the hub or, in other words, the fingers 24 are aligned with the hub 12. The protrusions 29 have chamfers 30 on their inboard sides and sharp corners on their outboard sides. The inboard side referring to the direction toward the connected end 23 of the fingers 24 and the outboard side referring to the direction nearest the rectangular aperture 19. The term inboard more generally means toward the inner part of the shaft 11, and outboard means toward the end of the shaft 11. A second position of the finger is shown in FIG. 4. In this position, the protrusion 29 is moved out of the bore 16 and the outer surface 28 is moved radially outward from the first position. As can be seen in FIG. 4, the outer surfaces 28 of the fingers 24 are above the outer surface 20 of the hub 12. In other words, the fingers 24 are not aligned with the hub 12 in their second position.

Figure 8:
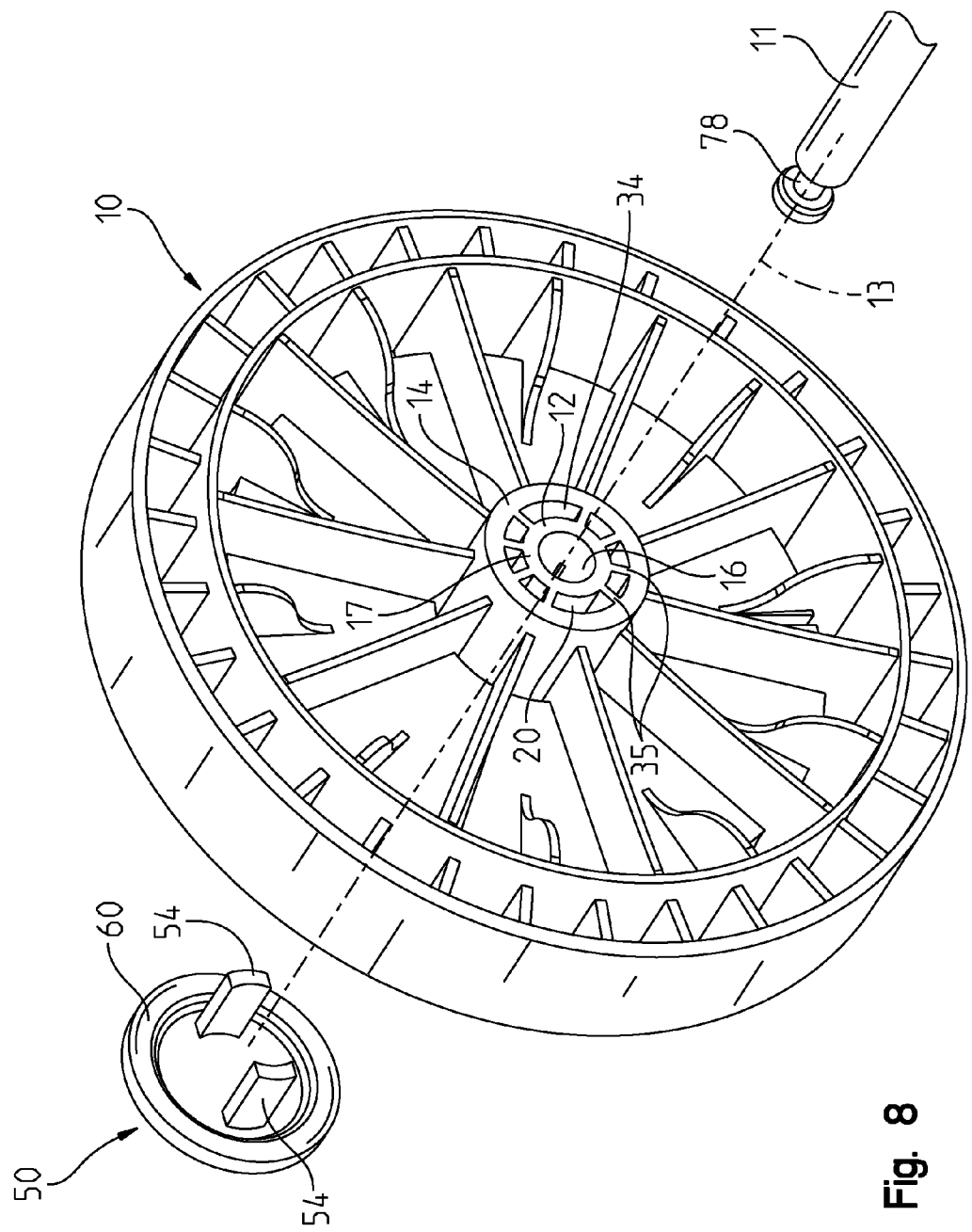
FIG. 8 is an exploded perspective view of the wheel shown in FIG. 1 from the inboard side.

The locking wheel 10 has an outer cylinder 14 that is concentric with the hub 12. The outer cylinder 14 has an inner surface 34 that is coaxial with the hub 12. The outer cylinder 14 is supported on the hub 12 by a series of spokes 35 as shown in FIG. 8. As can be seen in FIG. 4, the outer surface 28 of the fingers 24 nearly touch the inner surface 34 of the outer cylinder 14 when the fingers 24 are in their second position.

Figure 2:
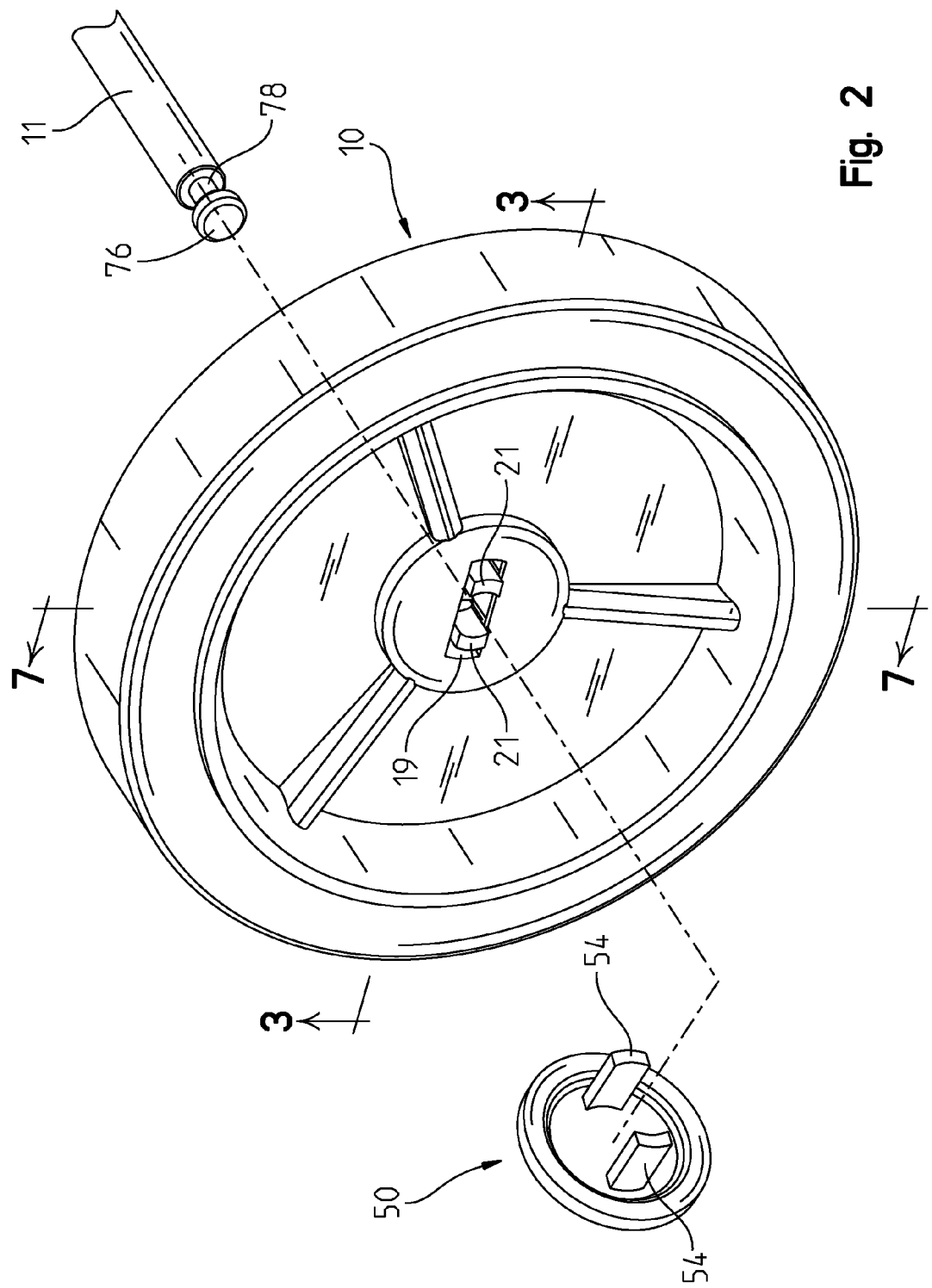
FIG. 2 is an exploded perspective of the wheel shown in FIG. 1.
Figure 6:
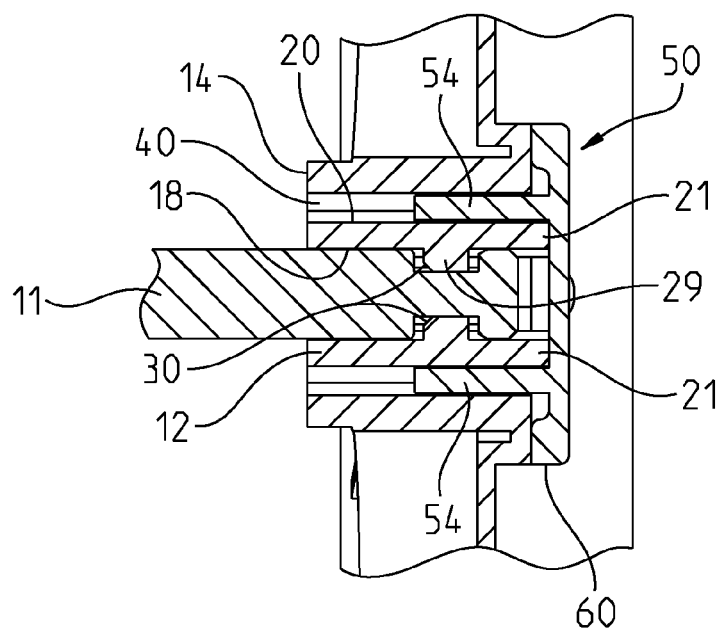
FIG. 6 is a sectional view taken about the line 3-3 in FIG. 2 showing the cap installed into the wheel.
Figure 7:
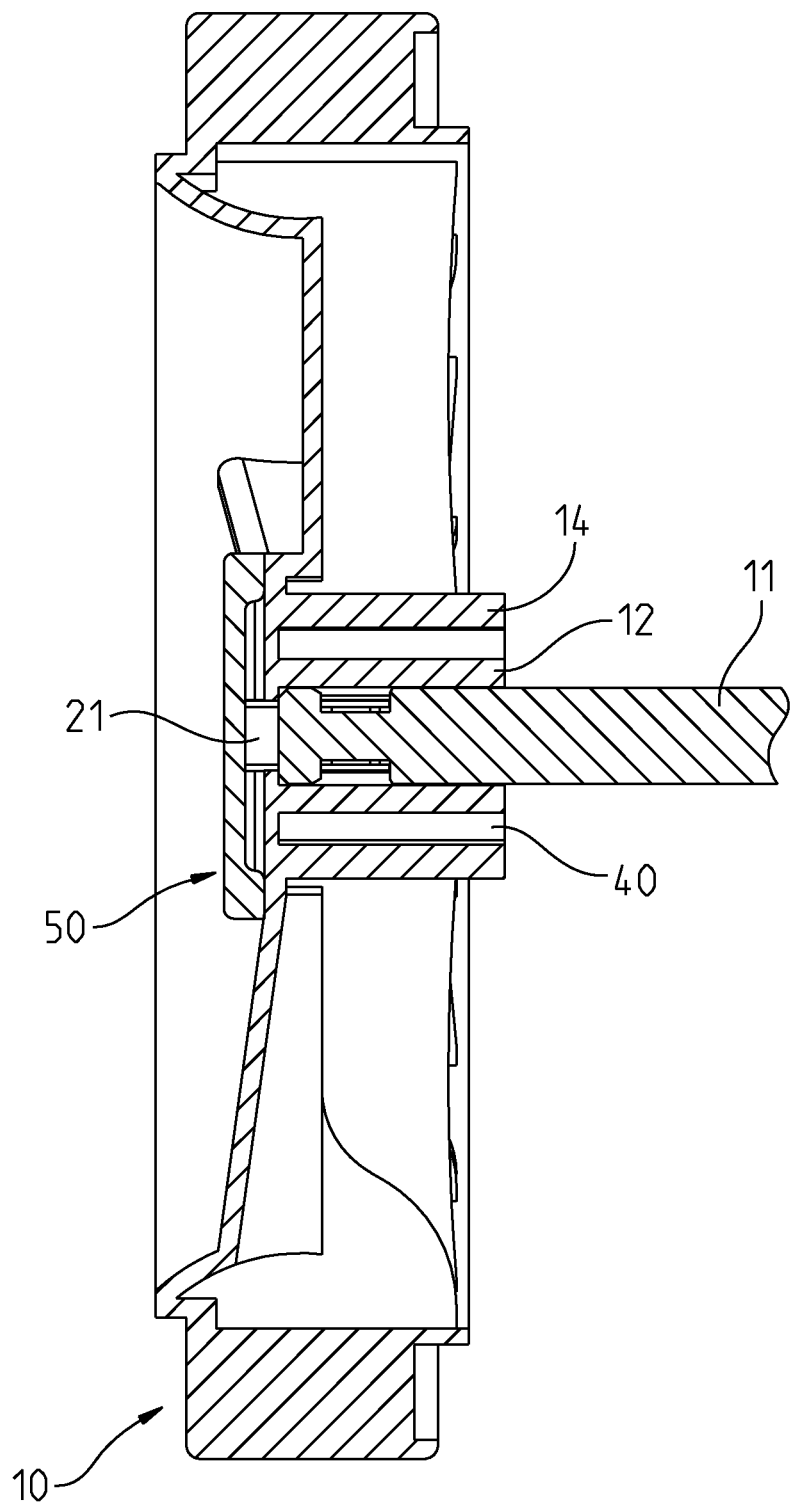
FIG. 7 is a sectional view taken about the line 7-7 in FIG. 2.

An insertable cap 50 is shown in FIG. 2 and is adapted for mating with the wheel 10. The cap 50 has an insertable portion 52 that has tabs 54 extending from the cap as shown in FIG. 7. The tabs 54 are adapted for being inserted in the annular space 40 between the outer surface 20 of the hub 12 and the inner surface 34 of the outer cylinder 14. FIG. 6 shows the cap 50 inserted into the space 40. Each tab 54 on the cap 50 fits between the outer surface 28 of a corresponding finger 24 and the inner surface 34 of the outer cylinder 14.

When a user of the wheel 10 wishes to install a wheel 10 on an axle shaft 11 he will first insert the axle 11 into the bore 16. The shaft 11 has a chamfer 76 on its end and a notch 78 near its end. When the chamfer 76 passes by the protrusions 29 on the fingers 24, the shaft 11 will push the fingers 24 into their second position shown in FIG. 4. Once the shaft 11 is fully inserted into the bore 16, the fingers 24 will return to their first position, and the protrusions 24 will extend into the bore 16 and be captured within the notch 78. The outboard side of the protrusions 24 have sharp corners that restrain the shaft 11 from leaving the bore 16. An additional method of preventing the shaft from leaving the bore 16 is to restrain the fingers 24 from moving into their second position. Inserting the tabs 54 on cap 50 into space 40 restrains the fingers 24 from moving into their second position. The tabs 54 adjacent to the fingers 24 occupy the space 40 so that the fingers 24 cannot move radially outward and therefore, the protrusions 29 remain extending into the notch 78 within the bore 16. The user will be certain the wheel 10 is locked onto the shaft 11 when the base 60 of the cap rests on the hub 12, as shown in FIG. 6. If it is desired to remove the wheel at a later time, the cap 50 is first removed from the wheel to expose the free ends 21. The free ends 21 are then pushed apart to move the fingers 24 into their second position as shown in FIG. 4. With the fingers 24 in their second position, the protrusions 29 are not within the notch 78 and the axle 11 may be removed.

The invention is not limited to the details above, but may be modified within the scope of the following claims.

What is claimed is:
1. A locking wheel comprising:
  a hub secured within said wheel adapted for fitting over an end of a shaft, said hub including a bore having an inner diameter for receiving a shaft and said shaft having an outer surface;
  a finger cantilevered in a direction aligned with an axis of said bore and adjacent to said bore having an inner surface and an outer surface, said finger including a protrusion having a raised surface relative to said inner surface of said finger, said protrusion adapted for extending into said bore for a predetermined distance, said finger being resilient and movable between a first position and second position, said first position having said protrusion protruding inwardly into said bore, said second position wherein said protrusion is located outwardly of said bore and said outer surface of said finger is radially outward relative to said first position; and
  a locking device to actively restrain movement of said finger from said first position into said second position.
2. A locking wheel as claimed in claim 1, wherein said wheel includes an outer member connected to said hub and spaced outwardly from said finger, said locking device having an insertable portion adapted for insertion between said finger and said outer member, whereby said finger is prevented from moving into said second position.
3. A locking wheel as claimed in claim 2, wherein said bore includes a bore wall defining said bore, said finger being aligned with said bore wall in said first position, and said finger being out of alignment with respect to said bore wall in said second position in a radially outward direction.
4. A locking wheel as claimed in claim 3, wherein said outer member is an outer cylinder being substantially coaxial with said hub.
5. A locking wheel as claimed in claim 3, wherein said wheel includes a pair of fingers opposingly located within said bore wall.
6. A locking wheel as claimed in claim 3, wherein said locking device is a cap having a base and said insertable portion is a tab extending from said base.
7. A locking wheel comprising:
  a hub secured within said wheel adapted for fitting over an end of a shaft, said hub including a bore defined by a bore wall having an inner diameter for receiving a shaft and said shaft having an outer surface and a notch;
  an outer cylinder connected to said hub and spaced outwardly from a finger;
  said finger cantilevered in a direction aligned with an axis of said bore and adjacent to said bore having an inner surface and an outer surface, said finger including a protrusion having a raised surface relative to said inner surface of said finger, said protrusion adapted for extending into said bore for a predetermined distance and adapted for being received in said notch on said shaft, said finger being resilient and movable between a first position and second position, said finger being aligned with said bore wall in said first position and said finger being out of alignment with respect to said bore wall in a radially outward direction in said second position; and
  a locking device insertable between said hub and said outer cylinder restraining movement of said finger from said first position to said second position when said device is between said outer cylinder and said finger, thereby retaining said axle within said bore when said protrusion is within said notch.
8. A locking wheel as claimed in claim 7, wherein said locking device is a cap having a tab extending therefrom, said tab being insertable between said hub and said outer cylinder.
9. A locking wheel as claimed in claim 8, having a pair of fingers opposingly cantilevered to said bore wall.
10. A locking wheel as claimed in claim 9, wherein said fingers extend outboard of said hub and outboard of said protrusion.
11. A locking wheel for use in combination with a shaft having an annular notch adjacent an end of said shaft, said locking wheel comprising:
  a hub secured within said wheel adapted for fitting over an end of said shaft, said hub including a bore defined by an annular bore wall having an inner diameter for receiving a shaft;
  an outer cylinder connected to said hub and spaced outwardly from said hub, said outer cylinder being substantially coaxial with said bore;
  a finger cantilevered in a direction aligned with an axis of said bore and said finger having an inner surface and an outer surface, said finger including a protrusion having a raised surface relative to said inner surface of said finger, said protrusion adapted for extending into said bore for a predetermined distance and adapted for being received in said notch on said shaft, said finger being resilient and movable between a first position and second position, said finger being substantially aligned with said bore wall in said first position and said finger being out of alignment with respect to said bore wall in a radially outward direction in said second position; and a locking device insertable between said hub and said outer cylinder that restrains movement of said finger from said first position to said second position when said device is located between said outer cylinder and said finger, thereby retaining said axle within said bore when said protrusion is within said notch.

12. A locking wheel as claimed in claim 11, wherein said wheel includes a pair of fingers opposingly located within said bore wall.

13. A locking wheel as claimed in claim 12, wherein said locking device is cap having tabs for extending between said hub and said outer cylinder, said tabs opposingly located on said cap.

\* \* \* \* \*